US008565721B2

(12) United States Patent
Caldwell et al.

(10) Patent No.: US 8,565,721 B2
(45) Date of Patent: Oct. 22, 2013

(54) SYSTEM AND METHOD FOR RATING AN IP-BASED WIRELESS TELECOMMUNICATIONS BASED ON ACCESS POINT

(75) Inventors: Christopher E. Caldwell, Woodstock, GA (US); Janne P. Linkola, Espoo (FI)

(73) Assignee: T-Mobile USA, Inc., Bellevue, WA (US)

(*) Notice: Subject to any disclaimer, the term of this patent is extended or adjusted under 35 U.S.C. 154(b) by 219 days.

(21) Appl. No.: 12/493,120

(22) Filed: Jun. 26, 2009

(65) Prior Publication Data

US 2010/0048165 A1   Feb. 25, 2010

Related U.S. Application Data

(63) Continuation of application No. 12/089,906, filed as application No. PCT/US2006/041225 on Oct. 20, 2006, now abandoned.

(51) Int. Cl.
*H04M 11/00* (2006.01)

(52) U.S. Cl.
USPC ............. 455/408; 455/422.1; 455/435.2; 370/382; 370/392

(58) Field of Classification Search
USPC ........... 455/406–410, 435–436, 456, 423, 67; 370/329, 401; 379/111, 114, 121
See application file for complete search history.

(56) References Cited

U.S. PATENT DOCUMENTS

| | | |
|---|---|---|
| 5,937,044 A | 8/1999 | Kim |
| 5,956,024 A | 9/1999 | Strickland et al. |
| 6,704,412 B1 | 3/2004 | Harris et al. |
| 6,781,959 B1 | 8/2004 | Garakani et al. |
| 6,785,535 B2 | 8/2004 | Lucidarme et al. |
| 7,012,888 B2 | 3/2006 | Schoeneberger et al. |
| 7,079,850 B2 | 7/2006 | Cameron et al. |
| 7,768,983 B2 * | 8/2010 | Nylander et al. ............. 370/338 |
| 2001/0036224 A1 | 11/2001 | Demello et al. |
| 2001/0048713 A1 | 12/2001 | Medlock et al. |
| 2001/0048714 A1 | 12/2001 | Jha |

(Continued)

FOREIGN PATENT DOCUMENTS

WO   WO-2005079087 A1   8/2005

OTHER PUBLICATIONS

International Search Report and Written Opinion, International Application No. PCT/US2006/41225, Filed on Oct. 20, 2006, Applicant: T-Mobile USA, Inc., Date of Mailing Mar. 19, 2008, 10 pages.

*Primary Examiner* — Marcos Batista
*Assistant Examiner* — Keith Fang

(57) ABSTRACT

A subscriber communicates over an IP-based wireless telecommunications network through an access point. Identifiers associated with the access point (e.g., MAC address IP address, FQDN . . . ) are stored in a database. Each access point is mapped into one or more service zones, where service zones are mapped to service types. The subscriber has a rate plan that is based on a selection of one or more service types. When a wireless connection between the subscriber and the IP-based wireless telecommunications network is established, the access point identifiers are used to retrieve a service zone ID from the database. Upon completion of the communication, a call detail record can be generated that includes the service zone ID for the communication. The billing system can then retrieve billing plan information to determine an appropriate rate for the subscriber based on the service zone ID.

23 Claims, 13 Drawing Sheets

(56) References Cited

U.S. PATENT DOCUMENTS

| | | |
|---|---|---|
| 2002/0013797 A1 | 1/2002 | Jha et al. |
| 2002/0018518 A1 | 2/2002 | Subramanian et al. |
| 2002/0031166 A1 | 3/2002 | Subramanian et al. |
| 2002/0062472 A1 | 5/2002 | Medlock et al. |
| 2003/0081580 A1 | 5/2003 | Vaidyanathan et al. |
| 2003/0109265 A1* | 6/2003 | Yamamoto et al. ........... 455/456 |
| 2004/0014423 A1 | 1/2004 | Croome et al. |
| 2004/0077331 A1 | 4/2004 | King |
| 2004/0192211 A1 | 9/2004 | Gallagher et al. |
| 2004/0233930 A1 | 11/2004 | Colby |
| 2005/0170818 A1 | 8/2005 | Netanel et al. |
| 2005/0181805 A1 | 8/2005 | Gallagher |
| 2005/0186948 A1 | 8/2005 | Gallagher et al. |
| 2005/0233733 A1 | 10/2005 | Roundtree et al. |
| 2005/0239441 A1 | 10/2005 | Eronen |
| 2005/0255879 A1 | 11/2005 | Shi et al. |
| 2005/0265279 A1 | 12/2005 | Markovic et al. |
| 2005/0266853 A1 | 12/2005 | Gallagher et al. |
| 2005/0271008 A1 | 12/2005 | Gallagher et al. |
| 2005/0272424 A1 | 12/2005 | Gallagher et al. |
| 2005/0272449 A1 | 12/2005 | Gallagher et al. |
| 2005/0282534 A1 | 12/2005 | Subramanian et al. |
| 2005/0286466 A1 | 12/2005 | Tagg et al. |
| 2006/0003757 A1 | 1/2006 | Subramanian et al. |
| 2006/0035646 A1 | 2/2006 | Fox et al. |
| 2006/0045057 A1 | 3/2006 | Nylander et al. |
| 2006/0045069 A1 | 3/2006 | Zehavi et al. |
| 2006/0052113 A1 | 3/2006 | Ophir et al. |
| 2006/0058020 A1 | 3/2006 | Fox et al. |
| 2006/0058021 A1 | 3/2006 | Fox et al. |
| 2006/0062225 A1 | 3/2006 | Li |
| 2006/0068784 A1 | 3/2006 | Fox et al. |
| 2006/0079228 A1 | 4/2006 | Marsico et al. |
| 2006/0099935 A1 | 5/2006 | Gallagher et al. |
| 2006/0223497 A1 | 10/2006 | Gallagher et al. |
| 2006/0268902 A1* | 11/2006 | Bonner ........................ 370/401 |
| 2006/0274703 A1 | 12/2006 | Connelly |
| 2008/0096504 A1 | 4/2008 | Linkola et al. |
| 2008/0125077 A1* | 5/2008 | Velazquez et al. ......... 455/404.2 |
| 2009/0215429 A1 | 8/2009 | Caldwell et al. |

* cited by examiner

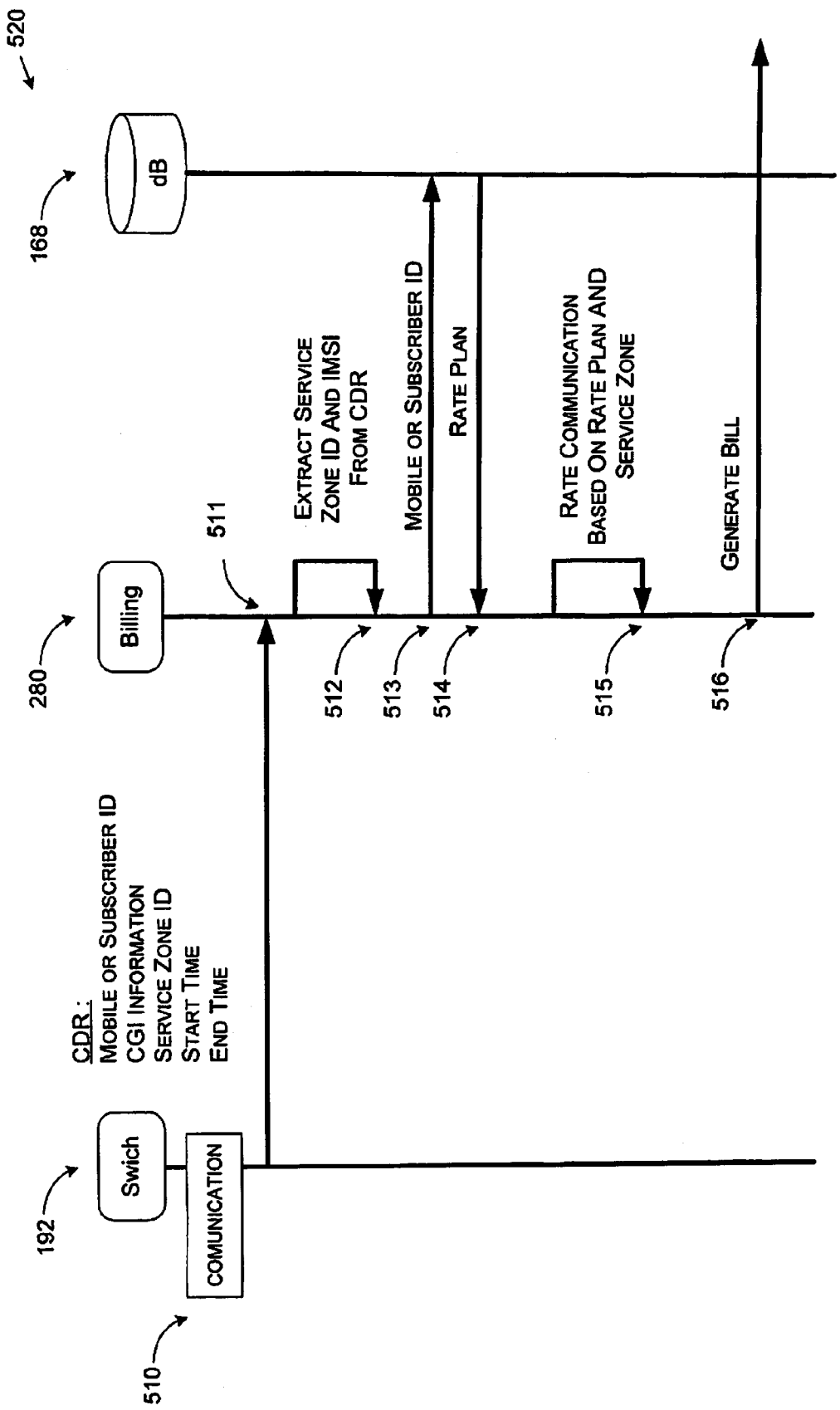

SYSTEM AND METHOD FOR RATING AN IP-BASED WIRELESS TELECOMMUNICATIONS BASED ON ACCESS POINT

RELATED APPLICATIONS

This utility patent application is a continuation application of U.S. patent application No. 12/089,906, now abandoned which is a U.S. National Stage application of International Application No. PCT/US06/41225, entitled "SYSTEM AND METHOD FOR RATING AN IP-BASED WIRELESS TELECOMMUNICATION BASED ON ACCESS POINT," filed Oct. 20, 2006, which claims the benefit under 35 United States Code §365 of International Application No. PCT/US06/39688, entitled "SYSTEM AND METHOD FOR BILLING IP-BASED WIRELESS TELECOMMUNICATIONS IN A CONVERGED NETWORK", which was filed on Oct. 11, 2006, which claims the benefit under 35 United States Code §119 of U.S. Provisional Patent Application No. 60/726,105, which was filed Oct. 12, 2005.

FIELD OF THE INVENTION

The present invention relates to billing systems in converged telecommunication networks. More specifically, the present invention is related to billing systems and methods for rating communications that are made through a point of access into an IP-based wireless telecommunication network based on various identifiers associated with the point of access.

BACKGROUND

A variety of technologies enable telecommunication services to be offered using Internet Protocol (IP). Commonly referred to as Voice over IP, or VoIP, such technologies enable telecommunications on any public or private IP network, including the Internet. VoIP technology permits a user to receive IP-based telecommunications services through a variety of devices, including a desktop computer, a notebook computer, an analog handset used in conjunction with a VoIP telephone adapter, a VoIP-enabled handset, or other like device.

Increasingly, mobile devices, such as notebook computers, personal digital assistants (PDAs), wireless handhelds, wireless handsets, or other similar devices, are also being enabled to receive IP-based telecommunications services. Such services are provided by enabling the mobile device to communicate with a wireless router and access any IP-based wireless access network, such as a network based on the IEEE 802.16 (WiMAX), IEEE 802.20 Mobile Broadband Wireless Access (MBWA), Ultra Wideband (UWB), 802.11 wireless fidelity (Wi-Fi), and Bluetooth standards.

Moreover, dual-mode mobile telecommunications devices may be enabled to communicate with any IP-based wireless access network. For instance, Unlicensed Mobile Access (UMA) technology allows wireless service providers to merge cellular networks, such as Global System for Mobile Communications (GSM) networks, and IP-based wireless networks into one seamless service with one mobile device, one user interface, and a common set of network services for both voice and data. UMA technology has recently been accepted into release 6 of the 3rd Generation Partnership Project (3GPP) standard as a General Access Network (GAN). With UMA or GAN solutions, subscribers may move between cellular networks and IP-based wireless networks with seamless voice and data session continuity as transparently as they move between cells within the cellular network. Seamless in-call handover between the IP-based wireless network and cellular network ensures that the user's location and mobility do not affect the services delivered to the user. Services may be identical whether connected over the IP-based wireless network or the cellular network. UMA technology effectively creates a parallel radio access network, the UMA network, which interfaces to the mobile core network using standard mobility-enabled interfaces. The mobile core network remains unchanged. The common mobile core network makes it possible for the service provider to have full service and operational transparency. The existing service provider Business Support Systems (BSS), service delivery systems, content services, regulatory compliance systems, and Operation Support Systems (OSS) can support the UMA network without change. Service enhancements and technology evolution of the mobile core network apply transparently to both cellular access and UMA.

The present disclosure has identified a number of problems in billing systems for converged networks such as UMA. Although the convergence of cellular and IP-based wireless telecommunications technologies offer substantial benefits to users, cellular service providers face many obstacles in implementing the IP-based component of converged product and service offerings. Service providers must implement new methods and systems, or adapt methods and systems currently implemented for the cellular component of their networks, of rating and billing of users' wireless communications. Cellular service providers' billing systems can be arranged to interpret and scale for cellular-based call detail records. As such, cellular service providers are ill equipped to handle billing based on access points and broadband Internet networks.

BRIEF DESCRIPTION OF THE DRAWINGS

Non-limiting and non-exhaustive embodiments are described with reference to the following drawings.

FIG. 5B is a diagram illustrating communication interactions for using service zone information to generate a bill for an IP-based communication.

DETAILED DESCRIPTION

Figure 1A:
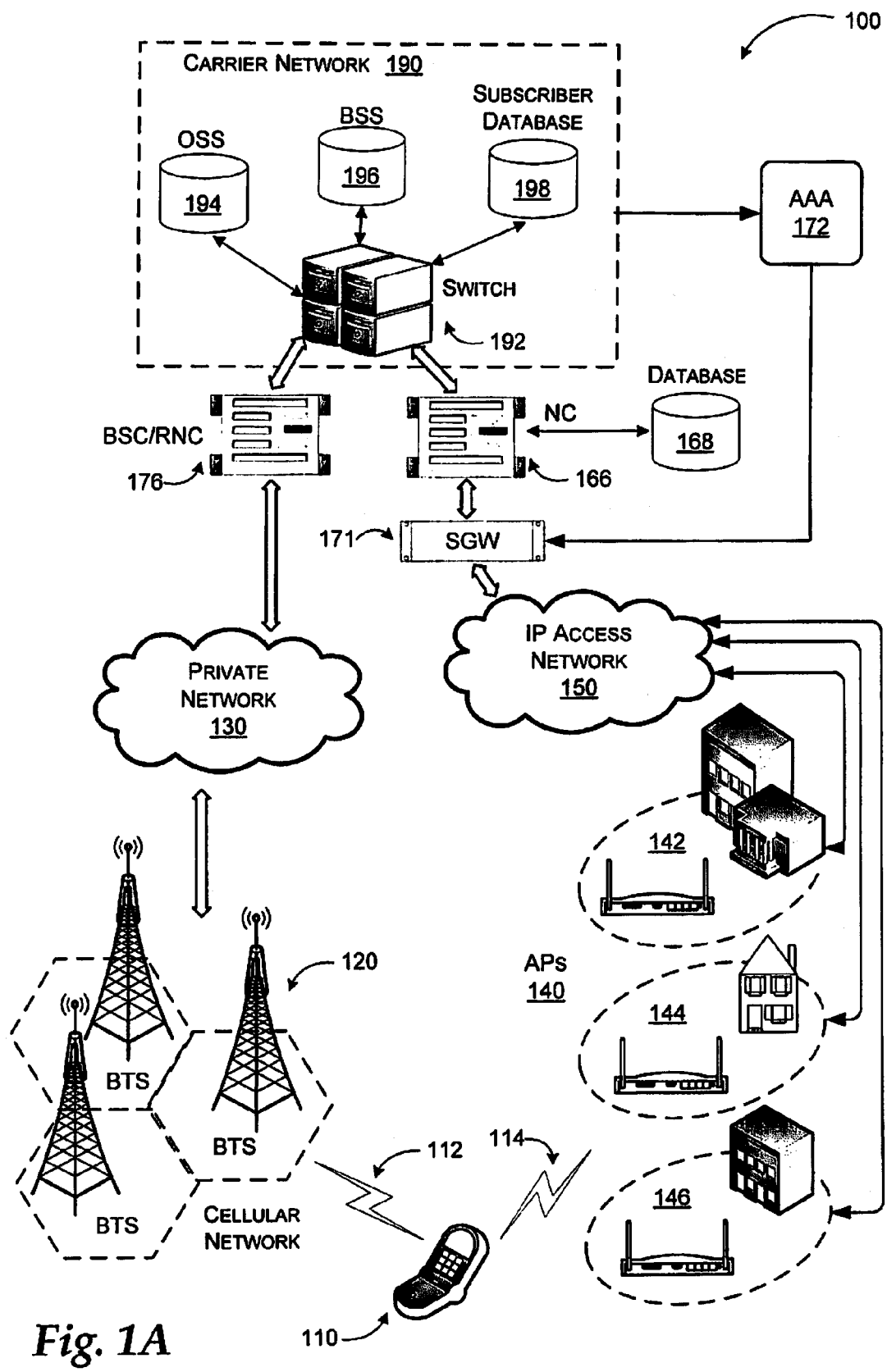
FIG. 1A illustrates an example converged wireless network system that combine a cellular telephone network with an IP-based wireless telecommunications network.

The present disclosure now will be described more fully hereinafter with reference to the accompanying drawings, which form a part hereof, and which show, by way of illustration, specific exemplary embodiments for practicing the invention. This disclosure may, however, be embodied in many different forms and should not be construed as limited to the embodiments set forth herein; rather, these embodiments are provided so that this disclosure will be thorough and complete, and will fully convey the scope to those skilled in the art. Among other things, the present disclosure may be embodied as methods or devices. Accordingly, the present disclosure may take the form of an entirely hardware embodiment, an entirely software embodiment or an embodiment combining software and hardware aspects. The following detailed description is, therefore, not to be taken in a limiting sense.

Briefly stated, the present disclosure relates to a system and method for rating communications by a subscriber through an access point over an IP-based wireless telecommunications network. Identifiers associated with the access point (e.g., MAC address IP address, FQDN . . . ) are stored in a database. Each access point is mapped into one or more service zones, where service zones are mapped to service types. The subscriber has a rate plan that is based on a selection of one or more service types. When a wireless connection between the subscriber and the IP-based wireless telecommunications network is established, the access point identifiers are used to retrieve a service zone ID from the database. Upon completion of the communication, a call detail record (CDR) can be generated that includes the service zone ID for the communication. The billing system can then retrieve billing plan information to determine an appropriate rate for the subscriber based on the service zone ID.

Example IP-based wireless communication networks include VoIP networks and/or converged wireless networks that include a combination of cellular networks and IP-based wireless telecommunications networks (e.g., unlicensed mobile access or UMA network technologies). A subscriber can access a VoIP network with a dual-mode wireless telecommunication device via a wireless connection with an access point. The dual-mode wireless telecommunication device can access either a cellular network or an IP-based wireless telecommunications network, such as a UMA network, thereby allowing mobile devices to roam voice, data and multimedia communications between conventional cellular networks and wireless local area network access points at home, in the office and at public areas (e.g., hot spots). Communications are transferred between the networks depending on whether the access point is in range or not, permitting users to transparently connect to the fastest or lowest cost network.

The described rating system may be useful in situations where unique billing plans are desired that permit unlimited or discounted calling zones based a single access point or based on a collection of access points. Access points are mapped to service zones. Every service zone operates similar to a "virtual" cell in a cellular telecommunications network. The "virtual" cell ID corresponds to the service zone identifier, which can be injected into the billing system such as via one or more fields in a call detail record (CDR). Each access point can have its own service zone, or be part of a seamless service zone that includes any number of access points. Since the service zones are not geographically bound, rate plans can be established in any number of unique ways as will become apparent.

Each subscriber can select a billing rate plan that can have a unique grouping of access points in its available service zones. In some examples, the billing rate plan can include a preferred service zone that has no per-minute charge for access. In other examples, the billing rate plan can include a service zone that is available at a discounted per-minute rate. Various combinations of free access zones and discounted zones can be designated together within a service plan.

Example Converged Telecommunications Networks

FIG. 1A illustrates an example converged wireless network system 100 that combines a cellular telephone network with an IP-based wireless telecommunications network (e.g., a UMA network). The described system 100 accepts registration requests and communication connections from a mobile device 110 to either a cellular telephone network or to an IP-based wireless telecommunications network.

The example cellular telephone network includes one or more cell towers 120 that are configured to accept cellular communications 112 from mobile device 110. The cell towers 120 are connected to a controller (such as base station controller/radio network controller (BSC/RNC)) 176 via a private network 190. The private network 190 can include a variety of connections such as T1 lines, a wide area network (WAN), a local area network (LAN), various network switches, and other similar components. Cell tower controller 176 controls network communication traffic to the carrier network 190, where all communications are managed. An example carrier network 190 includes a switch (such as a mobile switching center (MSC)) 192, which is configured to control data/call flows, perform load balancing, as well as other functions. A variety of system databases may also be accessed in the carrier network such as an operation support subsystem (OSS) database 194, a business support system (BSS) database 196, and a central subscriber database that contains details of a carrier's subscribers (such as a home location register (HLR)) 198, for billing, communication logging, etc.

The example IP-based wireless network includes one or more access points (APs) 140 that can accept IP communications 114 from mobile device 110. An access point can be configured as part of a wireless network in one or more locations such as a public network 142, a home network 144, or a private business network 146. Each access point is coupled to an Internet Protocol (IP) network 150 through a broadband connection. IP packets that carry communications (data, voice, SMS, etc.) are routed from the access points to a security gateway (SGW) 171 through the IP network 150. The security gateway controls access to the network controller 166, which communicates with a database 168 for logging and/or accessing various data associated with communications. The network controller 166 is also configured to manage access with the carrier network 190 in a similar manner to that performed by the BSC/RNC 176.

Authentication of a request for access by a mobile device over the IP-based network is handled by the security gateway 171, which communicates with an authentication, accounting and authorization (AAA) module 172 as shown in FIG. 1A.

Challenges and responses to requests for access by the mobile device are communicated between central subscriber database 198 and the AAA module 172. When authorization is granted, the security gateway 171 communicates the assignment of an IP address to the mobile device 110 that requested access. Once the IP address is passed to the mobile device 110 by the security gateway 171, the public IP address assigned to the device is passed to the network controller 166.

Figure 1B:
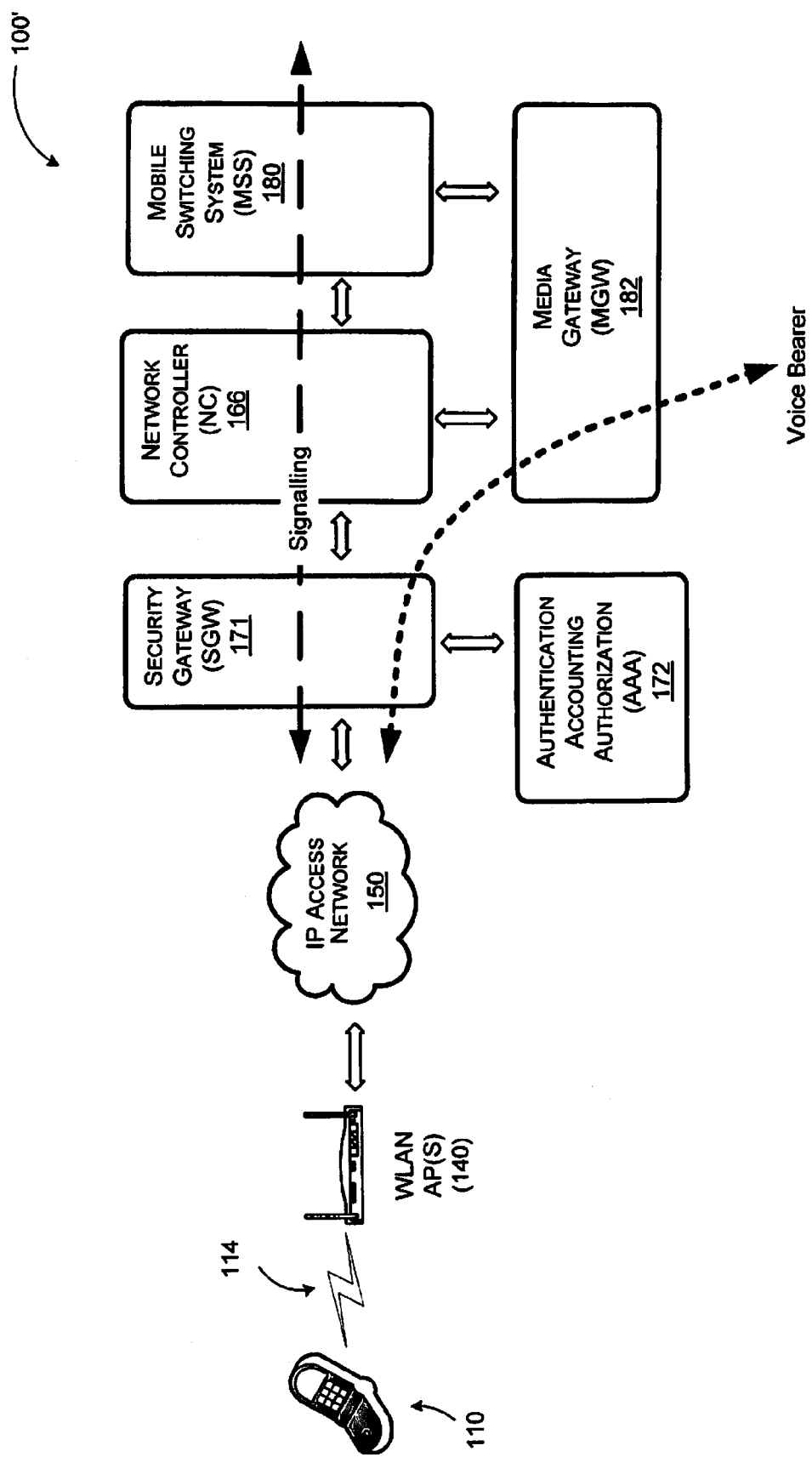
FIG. 1B illustrates another example converged system that combines a cellular telephone network with an IP-based wireless telecommunications network.

FIG. 1B illustrates another example converged system 100' that combines a cellular telephone network with an IP-based wireless telecommunications network (e.g., a UMA network). The described system 100' accepts registration requests and communication connections from a mobile device 110 to either a cellular telephone network (not shown) or to an IP-based wireless telecommunication network. The system 100' includes one or more access points (AP) 140 that accept communications 114 from mobile device 110. Each access point is coupled to an IP network 150 through a broadband connection. IP network 150 is configured to route communications (data, voice, SMS, etc.) between the access points 140 and a security gateway (SGW) 171. The security gateway 171 controls access to the network controller 166, which communicates with a database (not shown) for logging and accessing various data associated with communications. Authentication, accounting, and authorization are handled by SGW 171 via AAA module 172, as previously described.

For the example system 100', the signaling path of an IP-based communication is routed through the network controller 166 to a mobile switching system (MSS) 180, while the voice bearer path is routed through the network controller 166 to a media gateway (MGW) 182. The signaling portion of a communication governs various overhead aspects of the communication such as, for example, when the communication starts, when the communication stops, initiating a telephone ring, etc. The voice bearer portion of the communication contains the actual content (either data or voice information) of the communication. The MGW 182 controls the content flow between the service provider and the mobile device 110, while the MSS 180 controls the signaling flow (or controls overhead-related flow) between the service provider and the mobile device 110.

FIGS. 1A and 1B illustrate the components of a converged communication system that can be used for Voice over Internet Protocol (VoIP) communication devices. Each access point 140 can include a wireless router and a broadband modem that enable connection to an Internet Protocol (IP) network 150. A signaling gateway can be operated by a service provider to converts the VoIP signal to a traditional phone service signal. The phone signal can then be conveyed to the intended recipient via a public switched telephone network (PSTN).

When a mobile device accesses IP-based wireless network 150, information is initially formatted in the cellular system's native protocol and then encapsulated into Internet Protocol (IP) packets, transmitted to access point 140, and communicated over the Internet to the cellular service provider's mobile core network. Such transmissions bypass the service provider's existing network of radio towers. Because the same cellular protocols are used in communications involving IP access points as with traditional radio towers, the cellular service provider maintains a large degree of system compatibility even though using an IP-based network. The systems of the cellular service provider that deliver content and handle mobility may not even need to be aware that a subscriber's mobile device is on an IP-based wireless telecommunications network. The system may instead assume the mobile device is on its native cellular network. The IP network is therefore abstracted with respect to the cellular network, regardless of whether the mobile device connects to the cellular network via a base station (for licensed spectrum access) or a wireless access point (for licensed, semilicensed and/or unlicensed spectrum access).

The IP-based networks that can be accessed via wireless access point 140 can be any appropriate IP connectivity mechanism such as, but not limited to, a DSL (Digital Subscriber Line) modem, a cable modem, a satellite modem, or any other broadband Internet connection. The access points may be public or private, and may be located in a subscriber's home, in other apartments or residences, in public locations such as coffee shops, libraries, or schools, or in corporate locations.

Figure 2:
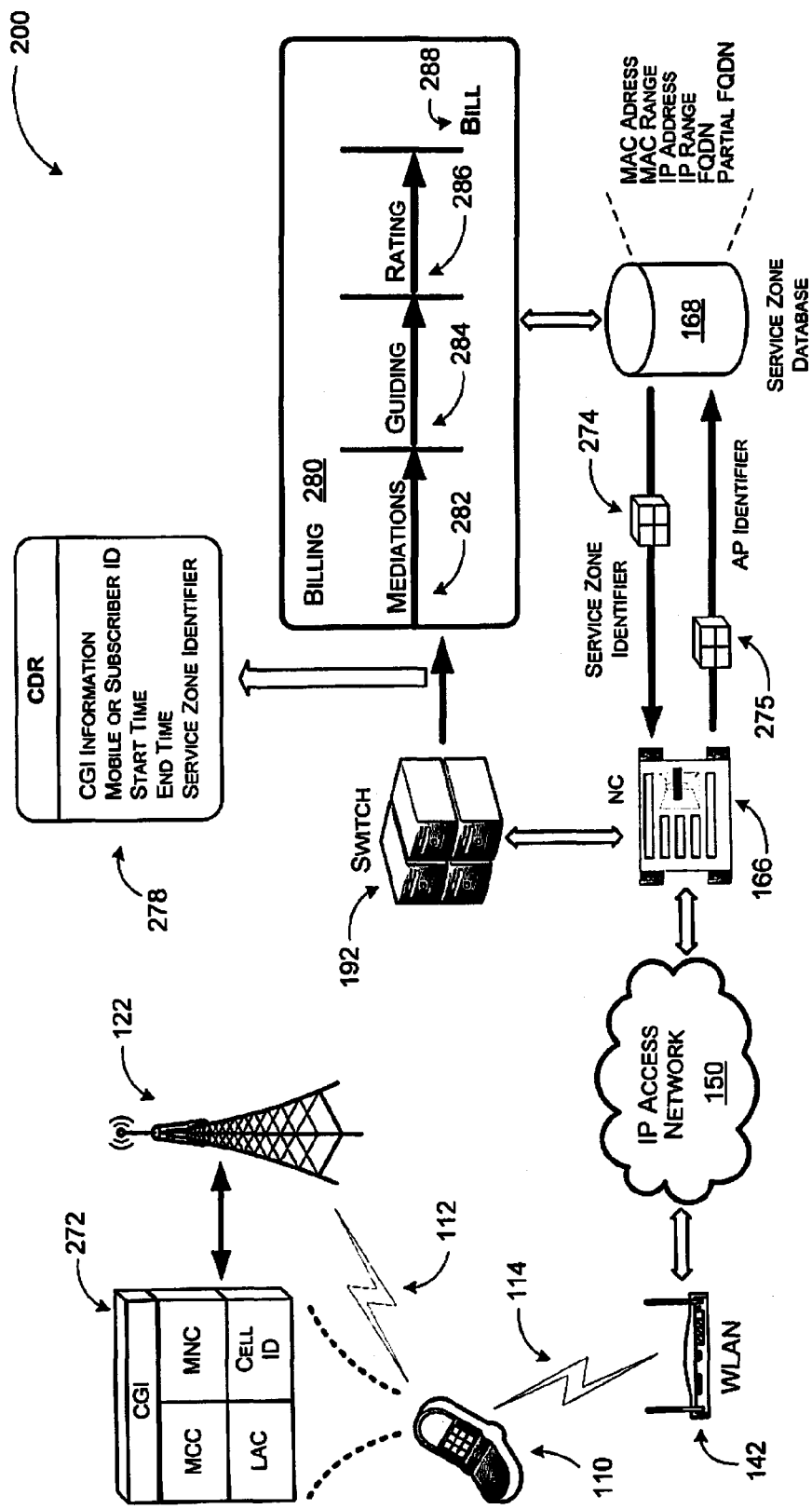
FIG. 2 is a conceptual diagram illustrating an IP-based network system and billing operations using service zones for billing operations according to one embodiment.

FIG. 2 is a conceptual diagram illustrating an IP-based network system 200 using service zones for billing operations according to one embodiment. In one example, existing fields from a call detail record (CDR) are utilized to store information that identifies a service zone as will be described. By reusing fields from an existing CDR the need to modify switch equipment is eliminated and thus modifications necessary to implement the billing system are minimal. The use of a CDR for this purpose is merely one example, and many others are also contemplated.

Examples of existing call detail record fields include those record fields defined for 2G and 3G cellular networks in applicable specifications, such as the 3GPP and 3GPP2 specifications. Furthermore, billing system modifications, especially mediations modifications, may be minimized by adding a specific flag. This may be accomplished by populating (i.e., overloading) an existing field of the CDR such as, for example, the Mobile Country Code (MCC) subfield portion of the starting Cell Global Identifier (CGI) with a specific value. According to some embodiments, the presence of a CDR may be flagged using an existing CDR field (e.g., MCC). Using an existing field of a CDR minimizes the impact to cellular service provider systems involved in billing subscribers.

In principle, a CGI value is the concatenation of Mobile Country Code (MCC)-Mobile Network Code (MNC)-Location Area Code (LAC)-Cell ID. They are used to identify individual transmission cells and the carrier that operates them. These CGI values are reported to a network controller when a mobile device registers to the network. The cellular service provider may use these reported CGI values to determine whether or not IP-based wireless telecommunications services should be offered. For example, there may be some countries where the cellular service provider may not offer "home" based service. In this case, the cellular service provider could choose not to provide service or to redirect the terminal to another provider. The cellular service provider may further use the reported CGI values to assist in determining the optimum serving network controller for a mobile terminal.

System 200 has the same basic organization as FIGS. 1A and 1B, and like components are labeled identically where appropriate. The described system 200 accepts registration requests and communication connections from a mobile device 110 to either a cellular telephone network or to an IP-based wireless telecommunications network.

Mobile device 110 can communicate 112 with a nearby cell tower 122 when a cellular based communication is initiated. During the communication setup for the cellular based communication, a call detail record (272) is initialized with various CGI values. Example CGI values 272 include MCC, MNC, LAC and CELLID. Mobile device 110 also communicates via the IP access network 150 through a wireless access point 142. The wireless access point 142 is configured to accept IP-based wireless communications 114 from mobile device 110 subject to various authentication requirements. IP packets that carry communications (data, voice, SMS, etc.) are routed from access points 142 to a security gateway (SGW) that controls access to the network controller (NC) 166, which communicates with a database 168 for logging and accessing various data associated with the communications. The IP packets are routed from the network controller 166 to a switch (such as a mobile switching center (MSC)) 192, which is configured to control data/call flows, perform load balancing, as well as other functions.

Upon completion of a communication, switch 192 generates a CDR 278 that is utilized by a billing system 280 for mediation 282, guiding 284, rating 286 and generating bills 288. CDR 278 includes CGI information, a mobile device or subscriber identifier (such as an International Mobile Subscriber Identity (IMSI)), a start time associated with the communication, an end time for the communication, and also includes a service zone identifier. Information that is passed to switch 192 by NC 166 is utilized by switch 192 to generate the CDR. In some implementations, one or more CGI fields can be overloaded with information from the NC 166 such that the switch 192 can be unaware of information being passed to the billing system such as the service zone identifier associated with the call.

Mobile device (110) communicates its mobile device or subscriber identifier to NC 166 during the initial communication setup, along with the initial CGI information, and any other relevant network information. The initial CGI information is associated with the nearby cell tower 122, which includes information such as MCC, MNC, LAC and CELL ID. The wireless access point 142 also can provide its own information to NC 166 such as SSID, MAC address, IP address, and FQDN. The NC uses the various information 275 from the access point (e.g., SSID, MAC address, IP address and FQDN, . . . ) to access database 168, which returns a service zone identifier 274.

Database 168 can be used to determine service zone identifier 274 in any number of ways based on access point identifier 275. In one example, each service zone identifier is keyed by a single Media Access Control (MAC) address which is a unique identifier that is associated with access point 142. In another example, service zone identifier 274 is keyed by any MAC address that is within a specified range. In yet another example, service zone identifier 274 is keyed by a specific IP address. In still another example, service identifier 274 is keyed by any IP address that is within a specified range. In another example, service zone identifier 274 is keyed by a fully qualified domain name (FQDN), which is an unambiguous domain name that specifies the access point's position in the network. In still another example, service zone identifier 274 is keyed by a partial FQDN match.

In some examples, database 168 has uniquely assigned key number that can be referenced by other databases. A simple interface can be provided for accessing database 168 that is keyed off of one of the AP identifiers 274. In some examples, one of the CGI fields from a CDR is used to store the value associated with the service zone identifier. In other examples, different fields from the CDR can be provided to designate the service zone. In some implementations, the CDR need not be used and a separate mechanism can be configured to provide a storage area for the service zone associated with the access point for a particular communication that is under way by a mobile subscriber.

In some examples, the service zone identifier 274 is stored by the NC by overloading a pre-existing field of the CGI. Switch 192 generates a CDR using CGI information in addition to other information such as start time, stop time, a mobile or subscriber identifier, etc. Since IP-based wireless communications do not utilize the cellular network, some information associated with the CGI can be discarded to provide the storage for the service zone identifier. The CDR, which now can include the service zone identifier encoded in a CGI field, is communicated to the billing system from switch 192. When the CGI information is extracted by the billing system, the billing system can interpret these fields as identifying the service zone for an IP-based wireless communication.

Service Zones, Types and Subscribers

Figure 3A:
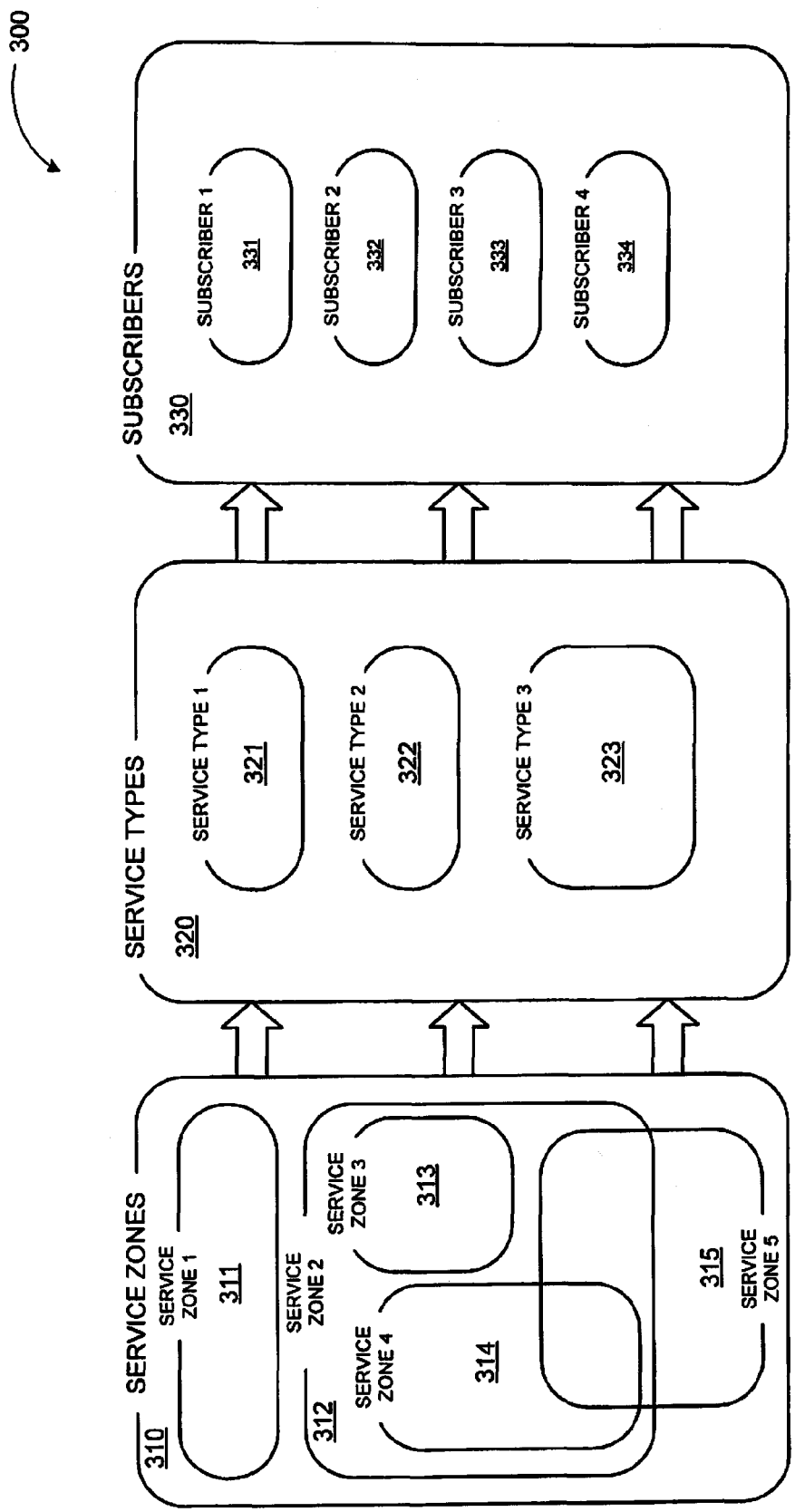
FIG. 3A is a conceptual diagram illustrating the mappings between service zones, service types and subscribers in accordance with some embodiments.

FIG. 3A is a conceptual diagram (300) illustrating the mappings between service zones 310, service types 320 and subscribers 330 in accordance with some embodiments. Each of the service zones 310 is mapped to one or more service types 320. Each service zone can include one or more access points. The access points can be designated in any appropriate way as previously described (IP address, MAC address, FQDN, etc.). Each service zone is mapped to a service type. A service type defines a collection of one or more service zones. Service types can be used to delineate the areas and rating schemes associated with a particular billing rate plan. Individual subscribers are assigned to a service type so that communications originating from a subscriber over an IP-based wireless telecommunications network are properly rated.

Figure 3B:
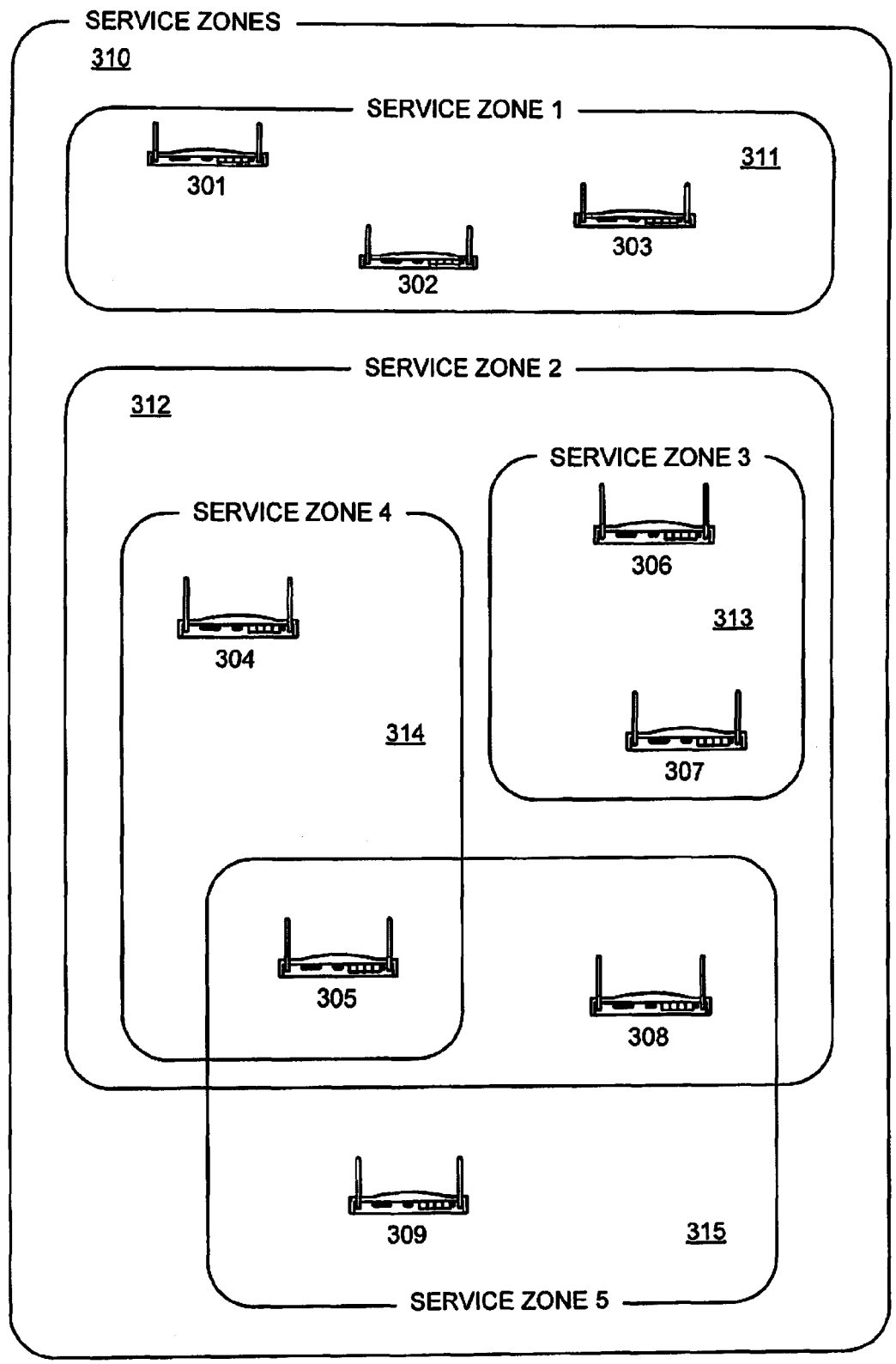
FIG. 3B is a conceptual diagram illustrating the mapping of service zones to access points.

FIG. 3B is a conceptual diagram illustrating the mapping of service zones to access points. A first service zone (service zone 1, 311) includes access points 301-303. A second service zone (service zone 2, 312) includes access points 304-308. A third service zone (service zone 3, 313) includes access points 306-307. A fourth service zone (service zone 4, 314) includes access points 304-305. A fifth service zone (service zone 5, 315) includes access points 305, 308 and 309. Some service zones are independent of the other service zones (e.g., 311), while other service zones are enclosed by another service zone (e.g., 313). In some instances, service zones can overlap (e.g., 312, 314, and 315).

Figure 3C:
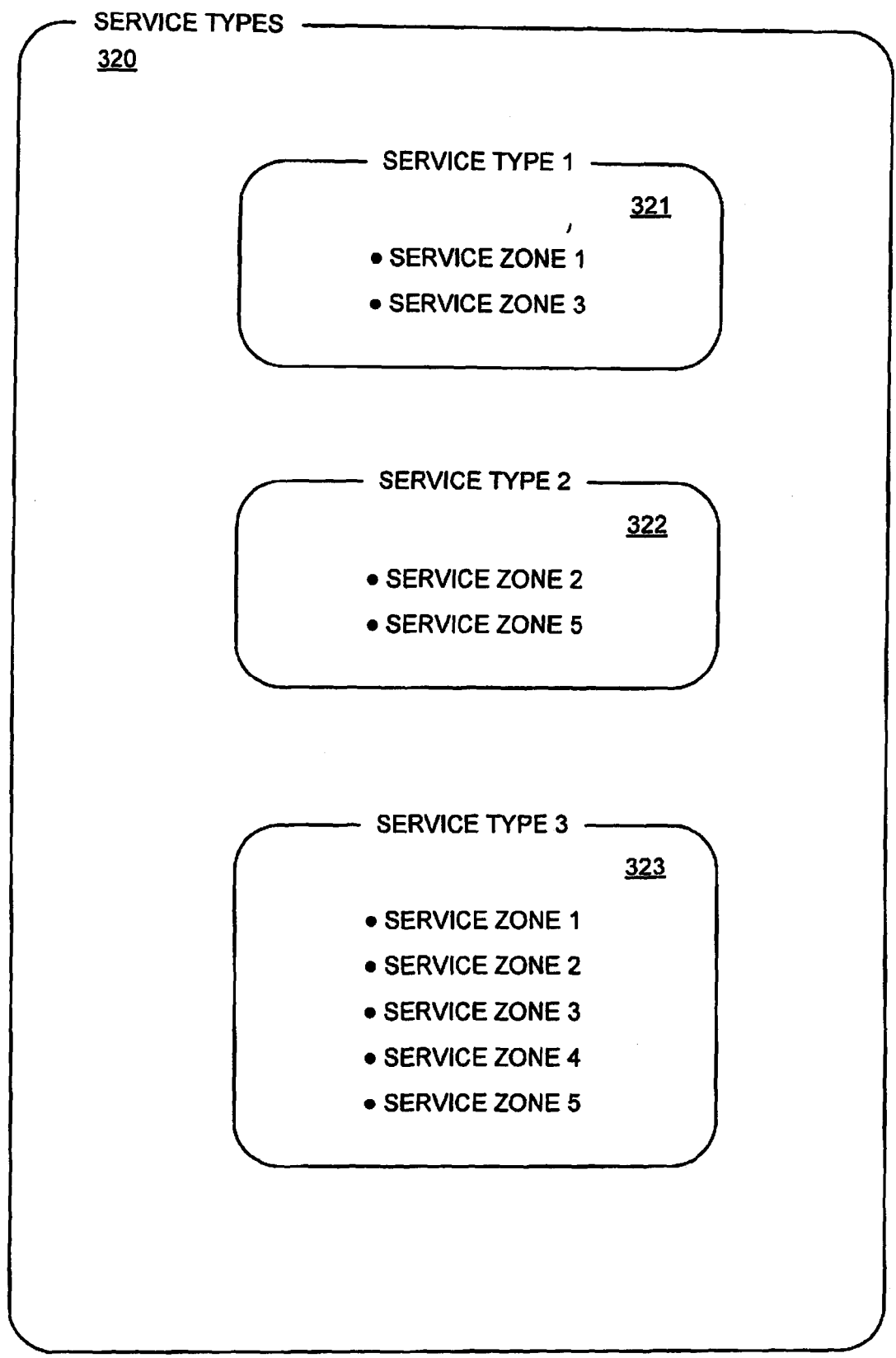
FIG. 3C is a conceptual diagram illustrating the mapping of service types to service zones.

FIG. 3C is a conceptual diagram illustrating the mapping of service types to service zones. A group 320 of three service types 321-323 are illustrated. Service type 1 (321) includes service zones 1 and 3. Service type 2 (322) includes service zones 2 and 5. Service type 3 (323) includes service zones 1 through 5. As illustrated, any number of zones can be mapped to a service type, and each zone can be the member of more than one service type.

Figure 3D:
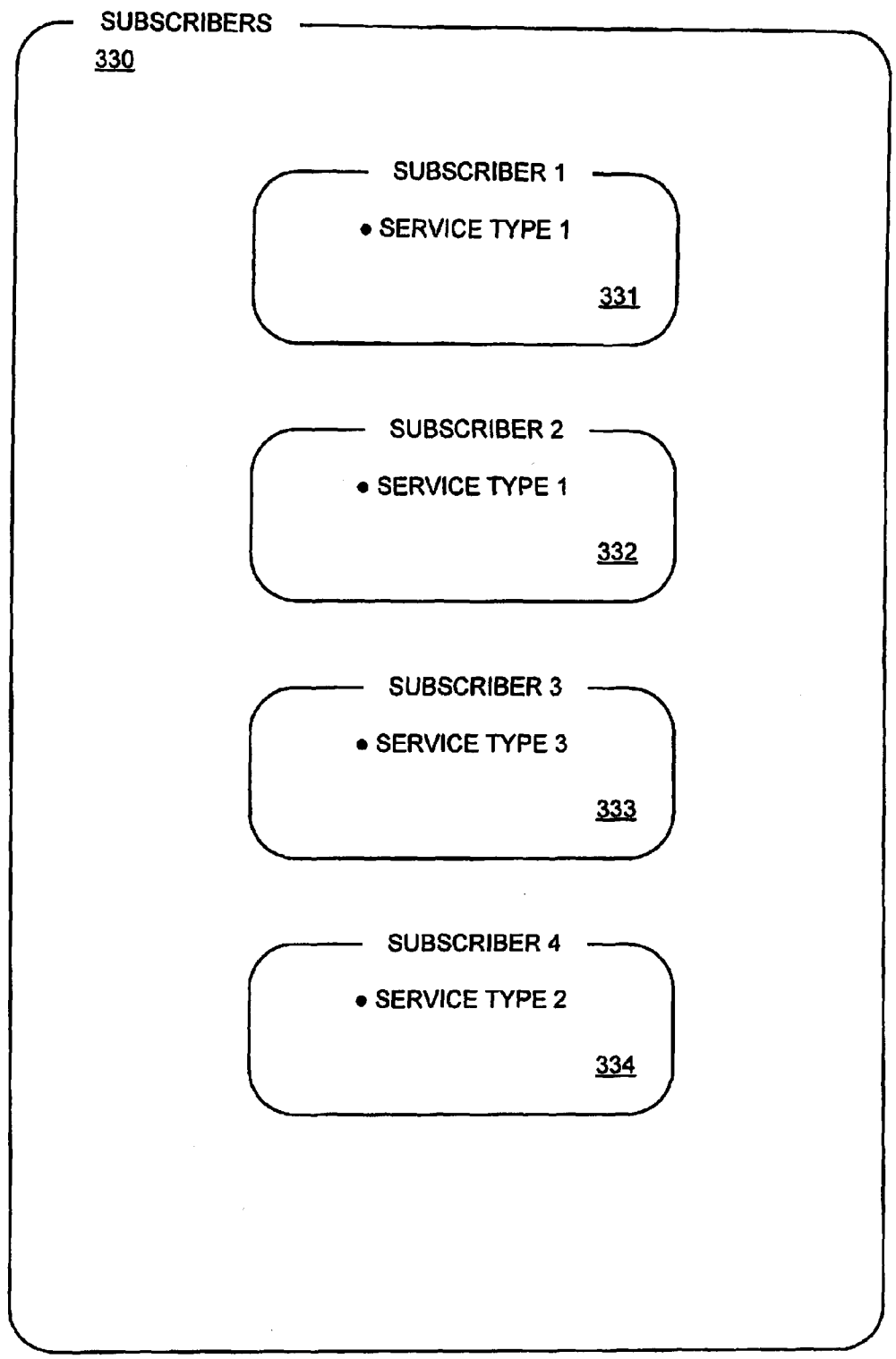
FIG. 3D is a conceptual diagram illustrating the mapping of subscribers to service types.

FIG. 3D is a conceptual diagram illustrating the mapping of subscribers to service types. A group 330 of four subscribers 331-334 are illustrated. The first subscriber (subscriber 1, 331) and the second subscriber (subscriber 2, 332) are both associated with service type 1. The third subscriber (subscriber 3, 333) is associated with service type 3, while the fourth subscriber (subscriber 4, 334) is associated with service type 2. As illustrated, multiple subscribers can subscribe to the same service type, or to different service types. Each service type is associated with a billing rate plan for IP-based wireless communications.

Figure 4:
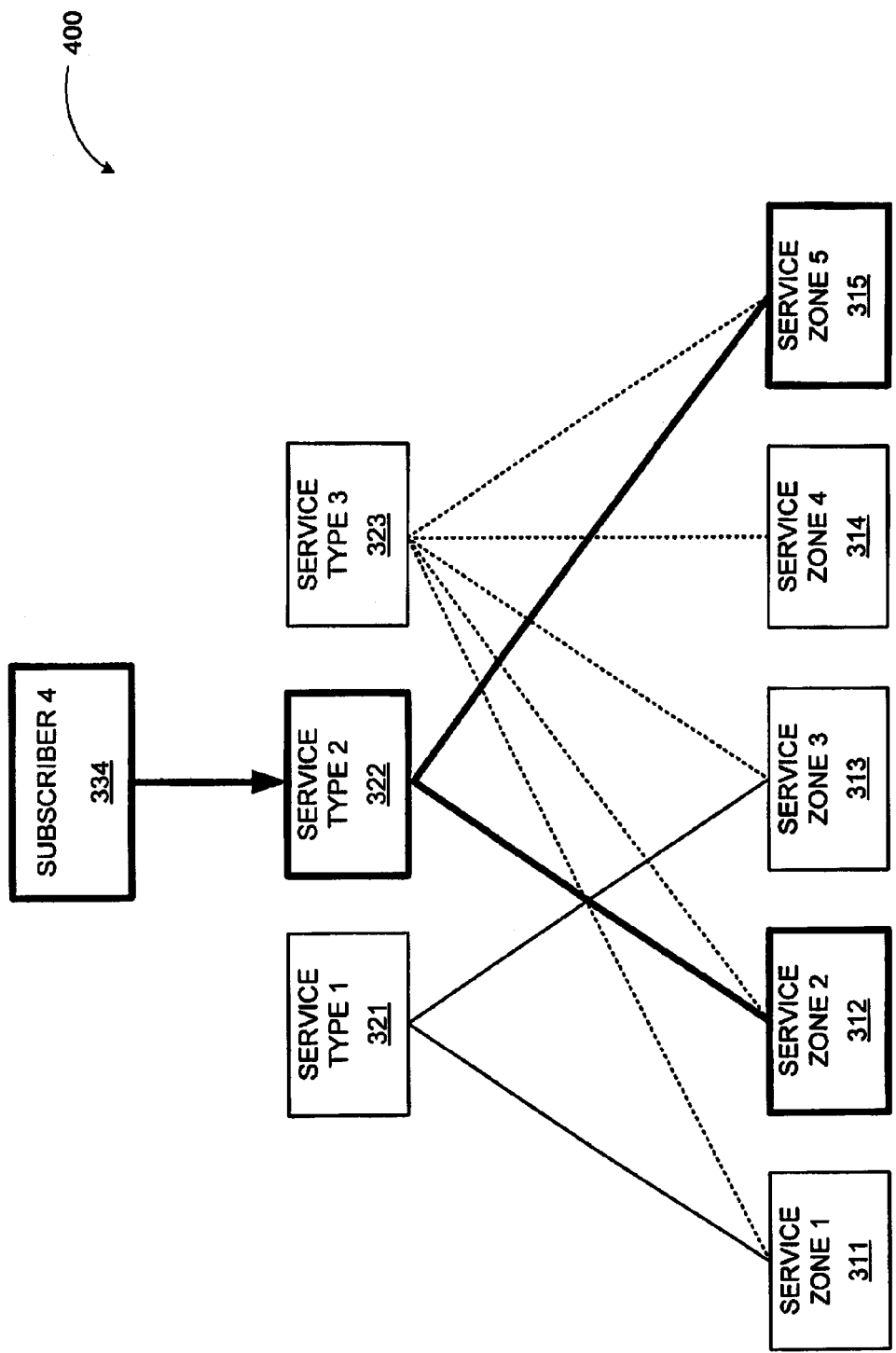
FIG. 4 is a diagram illustrating the relationship between a particular subscriber and various service types and service zones.

FIG. 4 is a diagram illustrating the relationship between a particular subscriber and various service types and service zones. In particular, subscriber 4 (334) is graphically illustrated as enrolling in service type 2 (322), which includes service zone 2 (312 and service zone 5 (315). The various lines further illustrate that service types can share common service zones. For example, service type 1 (321) includes service zones 311 and 313, while service type 3 (323) includes service zones 311-315.

Example Communication Interaction

Figure 5A:
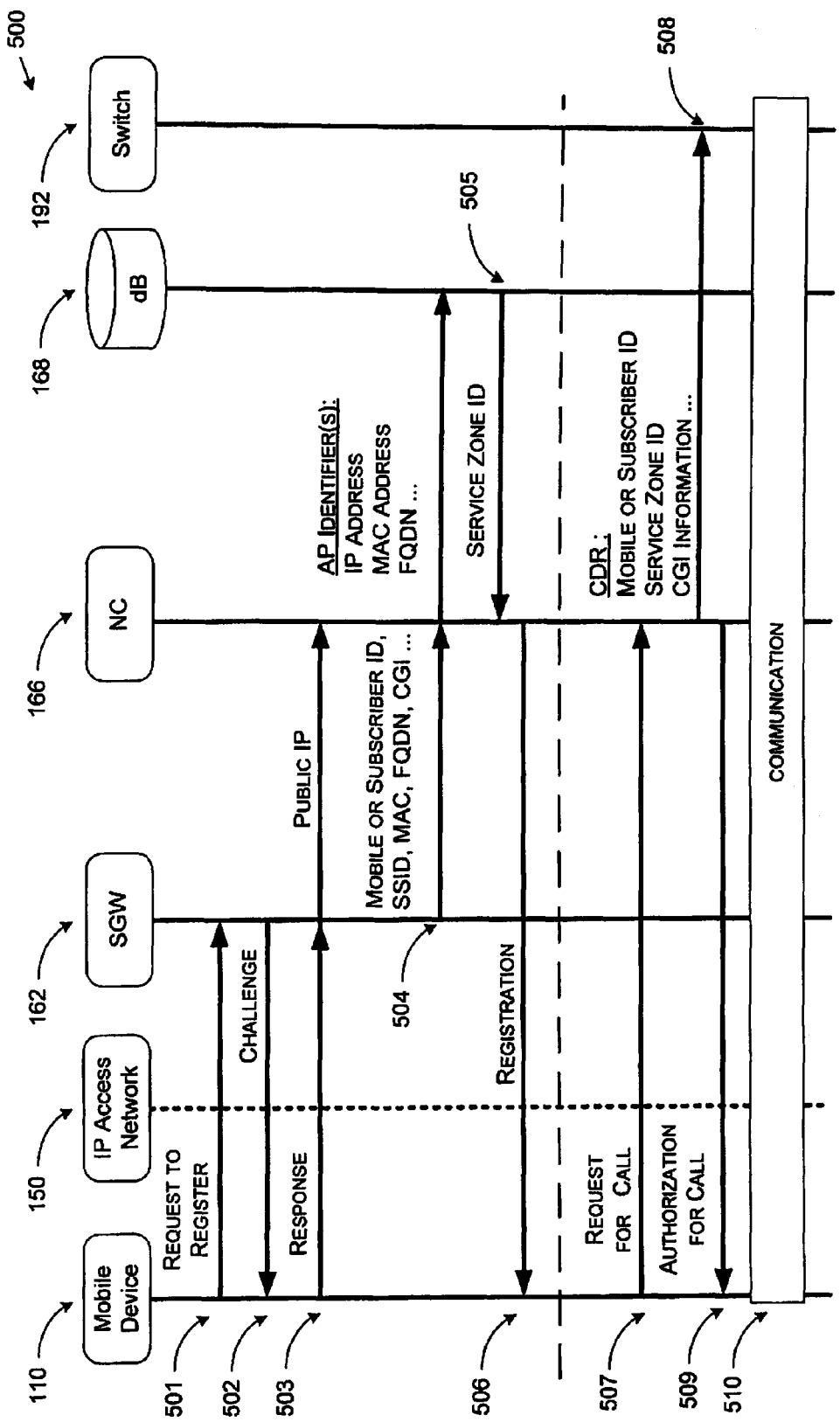
FIG. 5A is a diagram illustrating communication interactions for registering a subscriber in a service zone onto an IP-based network.

FIG. 5A is a diagram 500 illustrating communication interactions for registering a mobile device in a service zone onto an IP-based wireless telecommunications network. The communication registration process is illustrated by communication steps 501-506, while the communication process is illustrated by communication steps 507-510.

As shown in FIG. 5A, a communication is initiated when a mobile device 110 requests to register with the security gateway (SGW) 162 over the IP-based wireless access network 150 at step 501. SGW 162 replies with an authentication challenge that is communicated back to the mobile device 110 at step 502. At step 503, the mobile device 110 responds to the authentication challenge with a response that is communicated to SGW 162. Also at step 503, SGW 162 communicates a public IP address assigned to the access point to the network controller (NC) 166. The mobile device 110 also communicates the mobile device or subscriber identifier, SSID and a CGI record to the SGW 162. At step 504, the SGW 162 transmits the mobile device or subscriber identifier, CGI along with the SSID, MAC address, and FQDN from the access point that is in communication to the NC 166. NC 166 queries database 168 at step 504, including indexing parameters such as mobile device or subscriber identifier, IP address, MAC address, and FDQN. At step 505, database 168 replies with information that can be used with a CDR including the service zone identifier associated with the access point. At step 506, NC 166 communicates a registration completion to the mobile device 110.

Once the registration is completed, mobile device 110 can communicate with NC 166 to request a communication as illustrated by step 507. At step 508, NC 166 communicates the service zone identifier to switch 192 (e.g., by overloading a pre-existing field of the CGI), where the switch can generate a CDR that includes fields for the mobile device or subscriber identifier, a service zone identifier, and any other pertinent CGI information. Switch 192 authorizes the communication at step 509 such that the mobile device 110 can communicate over a communication channel that is established through switch 192 at step 510.

FIG. 5B is a diagram 520 illustrating communication interactions for using service zone information to generate a bill for an IP-based wireless telecommunication. The bill generation process is illustrated by communication steps 511-512, which commences when the communication is terminated.

As shown in FIG. 5B, when the communication is terminated at step 511, switch 192 communicates a CDR to billing system 280, where the CDR includes fields for a mobile device or subscriber identifier, CGI, start time, end time, and service zone. At step 512, the billing system extracts the service zone identifier and the mobile device or subscriber identifier from the CDR. At step 513 billing system 280 queries database 168 with the mobile device or subscriber identifier as the key index. Database 168 replies with a rate plan that can be designated by a service type. At step 515 the communication is rated based on the rate plan and the service zone that was accessed for the communication. At step 516 a bill is generated from the billing system 280 that reflects the rated communication.

Example Process Flows

Figure 6A:
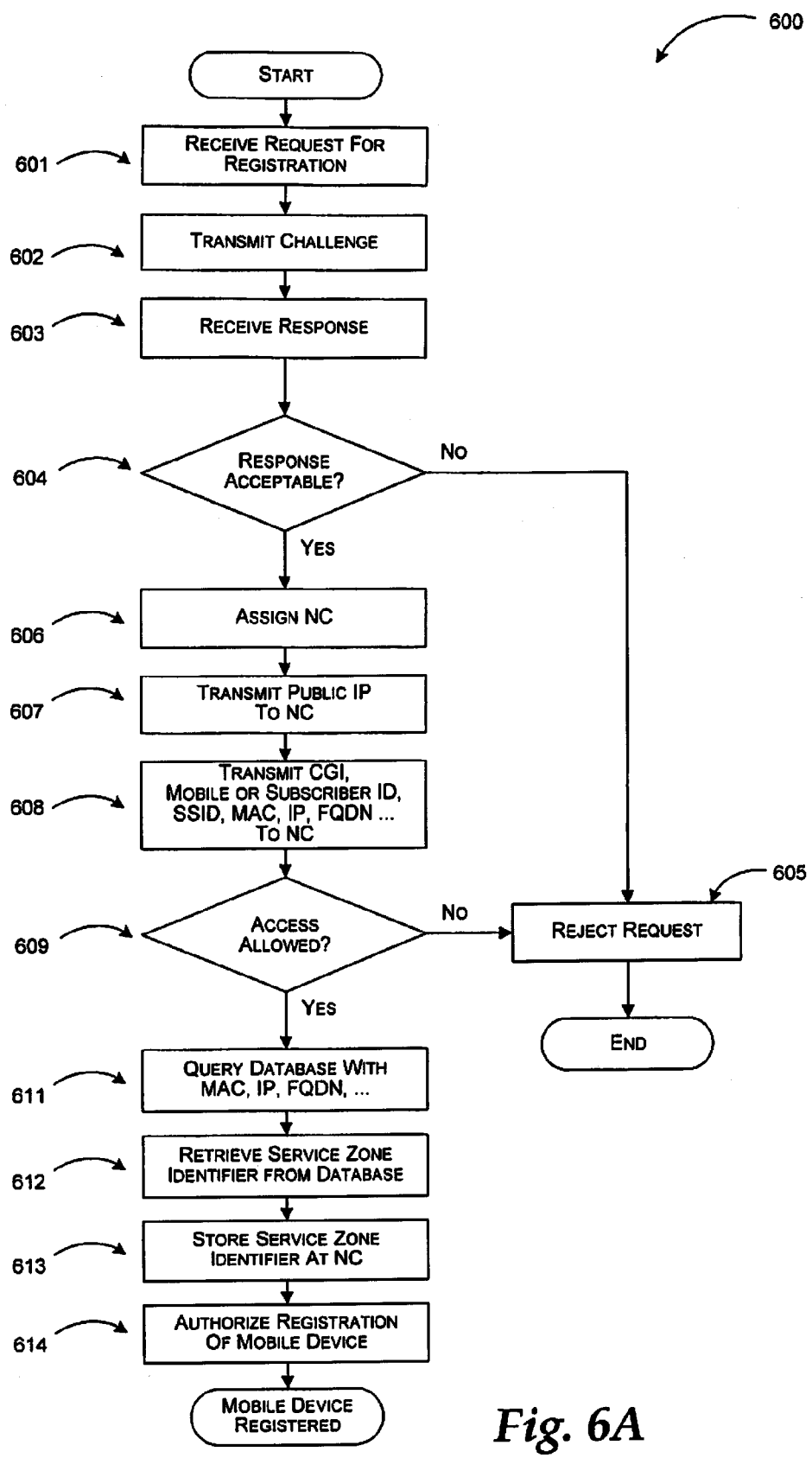
FIG. 6A is a flow chart illustrating a logic flow for registering a mobile device in a service zone onto an IP-based network.

FIG. 6A is a flow chart 600 illustrating a logic flow for registering a mobile device in a service zone onto an IP-based network. The registration process, which is similar to that described above for FIG. 5A, is illustrated by process steps 601-614.

At step 601 the registration request is received. A challenge is transmitted to the mobile device 110 at step 602. At step 603 the system receives a response to the challenge from the mobile device 110. At step 604, the response from the mobile device 110 is evaluated. Processing continues from step 604 to step 605 when the response in unacceptable, where the request is rejected. Otherwise, processing continues from step 604 to step 606.

At step 606, a network controller (NC) 166 is assigned to handle the connection. Proceeding to step 607, the public IP address associated with the access point 142 that the mobile device 110 used to access the network is communicated to the NC 166. At step 608 the SSID, MAC address and FQDN from the access point are communicated to the NC 166, along with the mobile device or subscriber identifier and CGI information from the mobile device 110. At step 609 the information received at the NC 166 is evaluated to determine if access to the network is granted. Processing flows from step 609 to step 605 when access is denied. Otherwise, processing continues from step 609 to step 611 when access is allowed.

At step 611, a key index is used to query the database 168, where the key index can be any one of: the MAC address, the IP address and the FQDN from the access point. The database 168 retrieves a service zone identifier based on the key index at step 612. In step 613, the service zone identifier is stored at the NC 166 such as by overloading a field from the CDR. At step 614, the registration authorization is transmitted to the mobile device 110.

Figure 6B:
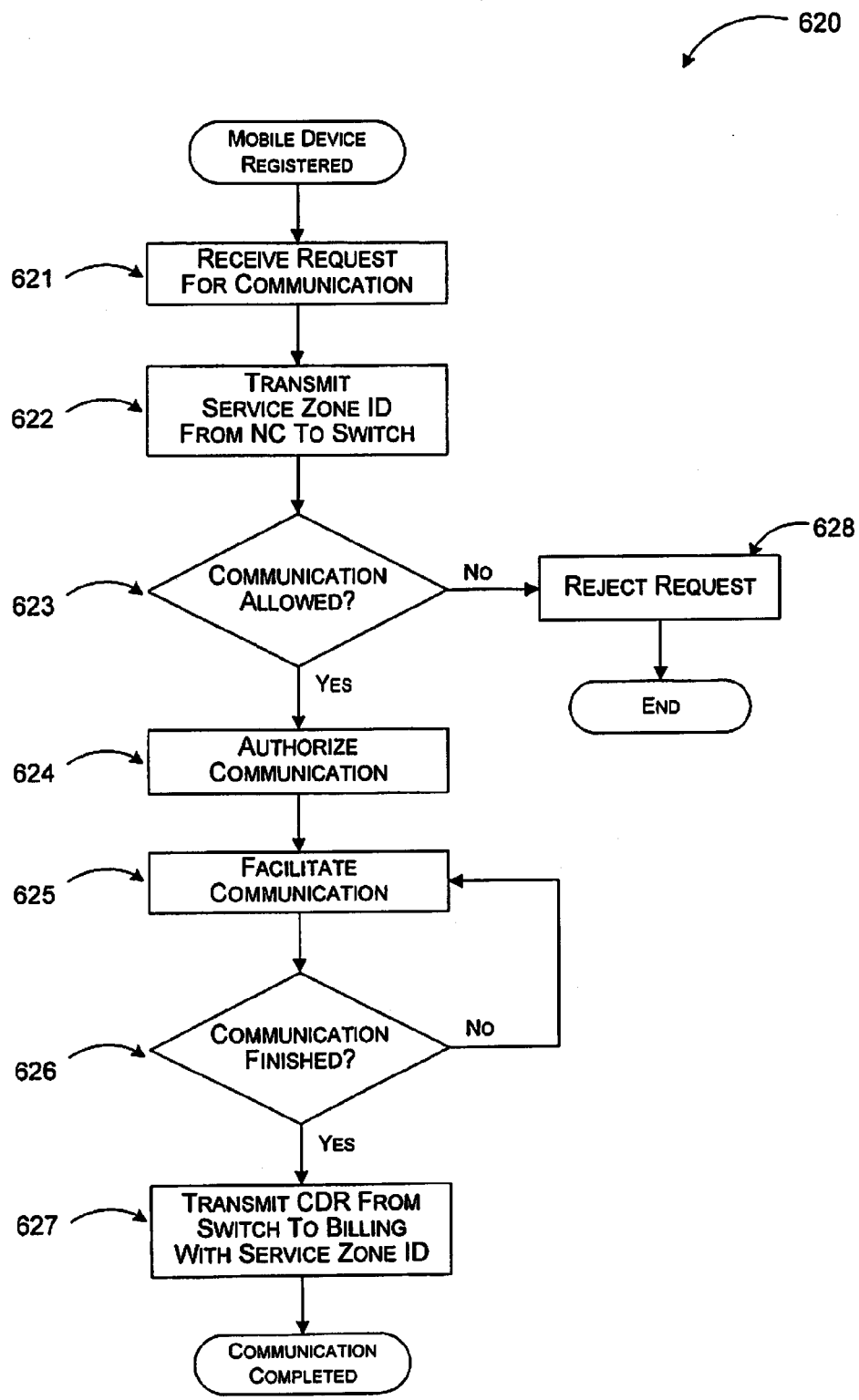
FIG. 6B is a flow chart illustrating a logic flow for initiating a communication with a registered mobile device that accesses an IP-based communication through a service zone.

FIG. 6B is a flow chart 620 illustrating a logic flow for initiating a communication with a registered mobile device 110 that accesses an IP-based communication through a service zone. The communication process, which is similar to that described above for FIG. 5A, is illustrated by process steps 621-627.

At step 621 the communication request is received by the network controller (NC) 166. Proceeding to step 622, the service zone identifier is transmitted from the NC 166 to the switch 192 (e.g., by overloading a CGI field), where the switch generates a CDR that includes the service zone identifier encoded therein. Processing continues from step 622 to step 623 where the information is evaluated to determine if the communication is allowed. Processing flows from step 623 to step 628 when the communication is rejected. Otherwise, processing continues from step 623 to step 624.

At step 624, the communication is authorized. Flowing to step 625, the communication is facilitated such as by transferring IP packets for the communication through the wireless IP network to the switch 192. At step 626, the communication is continually monitored to determine if the communication has been completed (terminated) such as by a communication hang-up or via an inadvertently dropped communication. Processing continues to step 625 when the communication is ongoing, or to step 627 when the communication has been completed. At step 627 the CDR is transmitted from the switch 192 to the billing system 280, where the CDR includes the service zone identifier encoded therein.

Figure 6C:
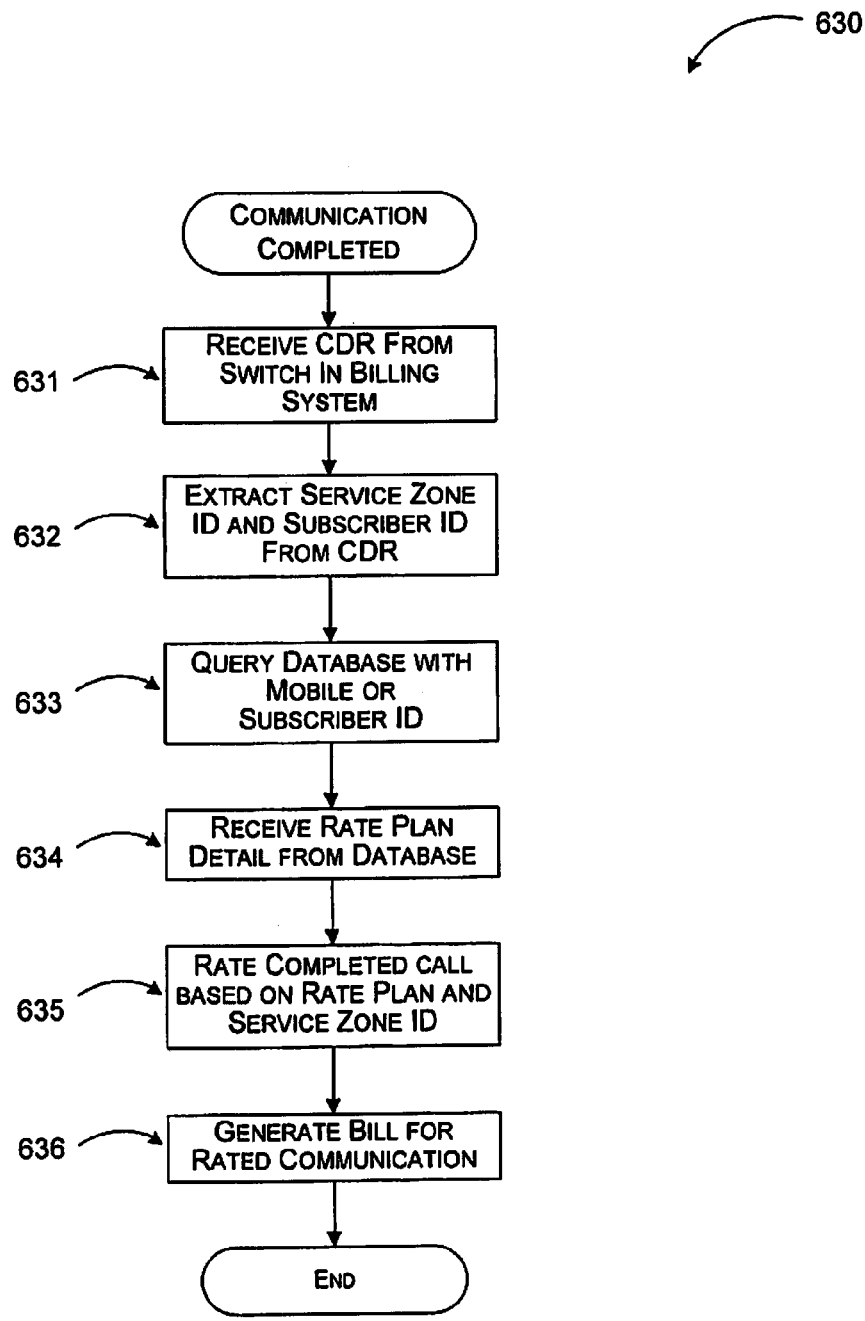
FIG. 6C is a diagram illustrating a logic flow for using service zone information to generate a bill for an IP-based communication.

FIG. 6C is a diagram 630 illustrating a logic flow for using service zone information to generate a bill for an IP-based wireless communication. The bill generation process, which is similar to that described above for FIG. 5B, is illustrated by process steps 631-636.

At step 631 the CDR is received from the switch 192 in the billing system, where the CDR includes the service zone identifier encoded therein. The service zone identifier and the mobile device or subscriber identifier is extracted from the CDR at step 632. Proceeding to step 633, the database 168 is queried using the mobile device or subscriber identifier as a key index. The rate plan is retrieved from the database 168 and returned to the billing system 280 at step 634, where the billing system 280 receives the rate plan. Continuing to step 635 the completed communication is rated based on the rate plan and the service zone identifier. A bill is generated at step 636 for the rated communication.

As previously described, billing system 280 is arranged to extract the service zone ID from CDR 278 after the communication has concluded. Each communication includes a mobile device or subscriber identifier, and a start time and a stop time for the communication. The service zone identifier 274 can be embedded into the CDR either in the CGI field, or in some other field of the CDR as may be desired. When the billing system 280 evaluates the CDR, the billing system will access one or more databases 168 (e.g., see above) to identify the subscribers billing plan (e.g., service type) and apply an appropriate billing policy based on the service zone that was used for the communication.

The following databases implementations are provided as an example implementation of database fields and keying indexes that may be employed by a billing and rating system. Although described below as three separate databases, any number of the databases can be combined or separated into additional or fewer databases without departing from the scope of the present disclosure. The below examples are provided as an illustration of some examples.

Example Database Implementations

Database 168 can be a service zone database that is indexed by Zone and organized as follows:

| Field Name | Data Type | Notes |
|---|---|---|
| Zone Number | Unique Integer | The database key. |
| Zone | IP address range, or MAC address range, or FQDN range | The zone is defined and keyed off of this field. The value can be a single value or a range of values. |
| CDR Field | Text | This is a value field that communicates the service zone identifier to the switch |
| Service Zone Text and Icon | Text, Icon | This is the string and numeric indicator for the mobile device to display when connected to the service zone |

As illustrated above, each service zone can include one or more access points. The access points are used to key the service zone using the "zone" field as the keying index for this database. The zone field can be a IP address, a MAC address or an FQDN address for an access point. The "zone" field can be arranged to key off of single values and values found within a range. For example, any access point with an IP address found within a specified range is considered within the scope of a zone.

The service zone identifier can be stored in a field of the CDR that is designated as "CDR Field". This permits a flexible design that can accommodate existing CDR records to minimize impact on existing switch equipment.

Each service zone can have a text string and/or a graphical icon that is displayed on the subscriber's communication device when connected to the identified zone. This field provides further flexibility in customizing the interface and the graphical feedback provided to a user.

Database 168 can be a service type database that is indexed by service type and organized as follows:

| Field Name | Data Type | Notes |
|---|---|---|
| Service Type | Unique Integer | The database key. |
| Zone Number(s) | Zone Number | The zone number can be a single number or multiple numbers. Each number can correspond to a database key from the service zone database described above. |

Each service type is assigned to any number of service zones, which each include any number of access points. The "Zone Number" field provides a list of zones that are designated by a particular service type. Some service types can include multiple service zones, while others can be a single service zone. Service types can be bundled based on any desired criteria such as, for example, all wireless access points for a chain of restaurants can be designated as a single zone or a single service type.

Database 168 can be a subscribers database that is indexed by the mobile device or subscriber identifier and organized as follows:

| Field Name | Data Type | Notes |
|---|---|---|
| Mobile Device or Subscriber Identifier (e.g. IMSI ID) | Unique Value | The database key |
| Service Type | Integer | Indicates the service type assigned to the mobile device. |
| UI Wrapper | MAC address, CGI value, Service Zone Text, Descriptor Text, Wave File | Indicates a MAC address/CGI pair and the Service Zone text, descriptor and sound byte to send to the mobile device |
| Time Zone | Integer | This value indicates the time zone that a communication occurred for billing purposes. The CGI LAC field can be overloaded in one example. |

Each subscriber is assigned to a service type, which is retrieved by a query using the mobile or subscriber identifier as the key index. The time zone associated with the mobile device is also assigned so that billing rates based on time of day can be properly applied.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computer-implemented method for facilitating Call Detail Record (CDR) based billing in a converged cellular network and Internet Protocol (IP)-based wireless access network, the method comprising:
  receiving a registration request with a network controller from a mobile device via an IP-based wireless access network of a converged wireless network for which CDR based billing is used;

sending an access point identifier to the network controller, wherein the access point identifier is associated with a point of entry into the IP-based wireless access network for the mobile device;

querying a database with the access point identifier;

receiving a reply from the database in response to the query, wherein the reply includes a service zone identifier, wherein the service zone identifier is associated with the point of entry into the IP-based wireless access network, wherein the service zone identifier is identified, at least in part, using the access point identifier, and wherein the service zone identifier is associated with a billing rate for the mobile device on the IP-based wireless access network;

storing the service zone identifier at the network controller;

identifying a communication request from the mobile device over the IP-based wireless access network through the point of entry into the IP-based wireless access network; and communicating the service zone identifier to a switch for the identified communication request from the mobile device.

2. The computer-implemented method of claim 1, wherein sending the access point identifier comprises sending an IP address to the network controller, wherein the IP address is associated with the point of entry into the IP-based wireless access network for the mobile device.

3. The computer-implemented method of claim 1, wherein sending the access point identifier comprises sending a Media Access Control (MAC) address to the network controller, wherein the MAC address is associated with the point of entry into the IP-based wireless access network for the mobile device.

4. The computer-implemented method of claim 1, wherein sending the access point identifier comprises sending a fully qualified domain name (FQDN) to the network controller, wherein the FQDN is associated with the point of entry into the IP-based wireless access network for the mobile device.

5. The computer-implemented method of claim 1, wherein querying the database with the access point identifier comprises sending a key index to a database in a query message, wherein the key index comprises either: an IP address, a MAC address, or a FQDN associated with the point of entry into the IP-based wireless access network for the mobile device.

6. The computer-implemented method of claim 1, further comprising: receiving the query at the database, locating a database entry associated with the query, and retrieving the service zone identifier associated with the database entry.

7. The computer-implemented method of claim 6, wherein locating the database entry comprises comparing an index from the query to a single value associated with the database entry.

8. The computer-implemented method of claim 7, wherein the range of values comprises either: an IP address, a MAC address, or a FQDN.

9. The computer-implemented method of claim 6, wherein locating the database entry comprises comparing an index from the query to a range of values associated with the database entry.

10. The computer-implemented method of claim 9, wherein the range of values comprises either: an IP address, a MAC address, or a FQDN.

11. The computer-implemented method of claim 1, wherein storing the service zone identifier at the network controller comprises: storing the zone identifier in a field of a CDR by overloading the field.

12. The computer-implemented method of claim 1, wherein storing the service zone identifier at the network controller comprises: storing the zone identifier in a Cell Global Identifier (CGI) field of a CDR by overloading the CGI field.

13. The computer-implemented method of claim 1, wherein identifying the communication request from the mobile device over the IP-based wireless system through the point of entry into the IP-based wireless access network comprises identifying an identifier associated with the mobile device.

14. The computer-implemented method of claim 1, wherein communicating the service zone identifier to the switch comprises sending a CGI to the switch from the network controller, wherein a field of the CGI includes the service zone identifier encoded therein.

15. The computer-implemented method of claim 1, wherein communicating the service zone identifier to the switch comprises sending a bookkeeping message to the switch from the network controller, wherein the bookkeeping message includes the service zone identifier encoded therein.

16. The computer-implemented method of claim 1, wherein the database is a service zones database that includes a number of database entries, wherein each database entry corresponds to a particular service zone that is keyed by an access point identifier, wherein each entry in the service zones database is associated with one or more access points associated with the particular service zone.

17. The computer-implemented method of claim 16, wherein each entry in the service zones database includes a field for a zone number that is a unique identifier that can be mapped to one or more service types.

18. The computer-implemented method of claim 16, wherein each entry in the service zones database includes a field for a zone number that is a unique identifier that can be mapped to one or more service types.

19. The computer-implemented method of claim 16, wherein the database is configured to identify a billing plan associated with a communication from the mobile device over the IP-based wireless access network based on a mobile device identifier and the service zone identifier, wherein the database includes at least one of:

a subscriber database, a service type database, a zones database, and an access points database.

20. A network controller having computer-readable instructions for facilitating Call Detail Record (CDR) billing in a converged cellular network and IP-based wireless access network, the computer-readable instructions comprising:

receiving a registration request associated with a mobile device that accesses an IP-based wireless network of a converged cellular network and IP-based wireless access network through an access point of the IP-based wireless network;

authenticating the registration request;

receiving an identifier associated with the access point;

querying a service zones database with the identifier associated with the access point of the IP-based wireless network, wherein the service zones database includes a plurality of database entries, and, wherein each entry in the service zones database includes a unique zone key, a zone definition, and a service zone identifier;

receiving a reply from the service zones database that includes a service zone identifier, wherein the service zone identifier is identified, at least in part, using the identifier associated with the access point of the IP-based wireless network;
storing the service zone identifier;
identifying a communication request from the mobile device over the IP-based wireless system;
initiating the communication after the communication request; and
communicating the service zone identifier to a billing system for billing a customer associated with the mobile device after the communication terminates.

21. The network controller of claim 20, wherein the identifier associated with the access point corresponds to either an IP address, a MAC address, or a FDQN associated with the access point.

22. The network controller of claim 20, wherein each entry in a service type database includes a unique service type key and one or more zone numbers, wherein each zone number associated with the service type database is mapped to a corresponding entry in the service zones database.

23. The network controller of claim 22, wherein each entry in a subscriber database includes a unique subscriber ID and an assigned service type, wherein the assigned service type is mapped to an entry in the service type database.

* * * * *